US 9,656,647 B2

(12) United States Patent
Endo et al.

(10) Patent No.: US 9,656,647 B2
(45) Date of Patent: May 23, 2017

(54) PNEUMATIC BOOSTER AND BRAKE SYSTEM

(71) Applicant: HITACHI AUTOMOTIVE SYSTEMS, LTD., Ibaraki (JP)

(72) Inventors: Mitsuhiro Endo, Minami-Alps (JP); Shuzo Watanabe, Minami-Alps (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 330 days.

(21) Appl. No.: 14/388,432

(22) PCT Filed: Mar. 26, 2013

(86) PCT No.: PCT/JP2013/058693
§ 371 (c)(1),
(2) Date: Sep. 26, 2014

(87) PCT Pub. No.: WO2014/006939
PCT Pub. Date: Jan. 9, 2014

(65) Prior Publication Data
US 2015/0040558 A1 Feb. 12, 2015

(30) Foreign Application Priority Data

Jul. 6, 2012 (JP) ................................. 2012-152946

(51) Int. Cl.
*B60T 13/24* (2006.01)
*F15B 13/02* (2006.01)
(Continued)

(52) U.S. Cl.
CPC ............ *B60T 13/241* (2013.01); *B60T 13/52* (2013.01); *B60T 13/57* (2013.01); *F15B 13/021* (2013.01)

(58) Field of Classification Search
CPC ......... B60T 13/46; B60T 13/52; B60T 13/569
(Continued)

(56) References Cited

U.S. PATENT DOCUMENTS

| 4,499,812 A | 2/1985 | Pressaco et al. |
| 6,213,569 B1 | 4/2001 | Tsubouchi |
| 7,216,577 B2 * | 5/2007 | Haerr .................... B60T 13/569 91/369.1 |

FOREIGN PATENT DOCUMENTS

| EP | 0 107 997 | 5/1984 |
| EP | 0 119 880 | 9/1984 |

(Continued)

OTHER PUBLICATIONS

Extended European Search Report issued May 24, 2016 in corresponding European patent application No. 13 81 3761.
(Continued)

*Primary Examiner* — Thomas E Lazo
(74) *Attorney, Agent, or Firm* — Wenderoth, Lind & Ponack, L.L.P.

(57) ABSTRACT

A pneumatic booster (40) disposed between a brake pedal (5) and a master cylinder (7) includes a cylindrical member (60) provided on an outer circumferential side of an output rod (58). A seal member (62) seals between an outer circumferential side of the cylindrical member and a cylindrical portion of a front shell, and an O-ring seals between the cylindrical member and the output rod. The cylindrical member causes a differential pressure between a negative pressure chamber (A) and an atmosphere chamber (C) to be applied to a valve body (46). One axial side of the cylindrical member is configured to cause an atmosphere pressure to be applied to the valve body by abutting against a cylindrical protruding portion of the valve body, thereby pushing the
(Continued)

valve body with the aid of the differential pressure in the direction as a biasing direction of a return spring.

14 Claims, 7 Drawing Sheets

(51) Int. Cl.
*B60T 13/52* (2006.01)
*B60T 13/57* (2006.01)

(58) Field of Classification Search
USPC ........................................................ 91/376 R
See application file for complete search history.

(56) References Cited

FOREIGN PATENT DOCUMENTS

| | | |
|---|---|---|
| JP | 59-96049 | 6/1984 |
| JP | 59-156853 | 9/1984 |
| JP | 4-185571 | 7/1992 |
| JP | 9-295568 | 11/1997 |
| JP | 9-323640 | 12/1997 |

OTHER PUBLICATIONS

International Search Report issued Apr. 23, 2013 in International Application No. PCT/JP2013/058693.

* cited by examiner

PNEUMATIC BOOSTER AND BRAKE SYSTEM

TECHNICAL FIELD

The present invention relates to a pneumatic booster used as, for example, a negative pressure booster of a brake system for a vehicle, and a brake system with the pneumatic booster employed therefor.

BACKGROUND ART

Generally, a brake system of a vehicle includes a pneumatic booster disposed between a brake pedal and a master cylinder. This type of pneumatic booster boosts a pressing force applied from the brake pedal to an input rod according to a pressure difference between a constant pressure chamber and a variable pressure chamber inside the pneumatic booster. By this operation, the pneumatic booster is configured to transmit a large output from an output rod to the master cylinder side. The constant pressure chamber (i.e., a negative pressure chamber) of the pneumatic booster is connected to an intake manifold of an engine for the vehicle, and the constant pressure chamber is set into a lower pressure state than an atmospheric pressure with the aid of a negative pressure generated in the intake manifold. A biasing member (i.e., a return spring) is provided at the pneumatic booster so as to be able to retort a valve body to the variable pressure chamber (i.e., the input rod) side when a braking operation by the brake pedal is released (PTL 1).

CITATION LIST

Patent Literature

PTL 1: Japanese Patent Application Public Disclosure No. 9-323640

SUMMARY OF INVENTION

According to a conventional technique, the return spring of the pneumatic booster is set so as to be able to return the valve body to the variable pressure chamber side even when the negative pressure in the constant pressure chamber is sufficient. In other words, a spring force of the return spring is set to a relatively strong force so as to be able to overcome a force from the negative pressure. The intake manifold of the engine for the vehicle cannot generate a negative pressure, once the engine is stopped when the vehicle is stopped ox the like.

Therefore, if no idling is encouraged for the purpose of reducing an amount of fuel consumed by the engine, the pressure in the constant pressure chamber of the pneumatic booster when the vehicle is stopped is easily placed into a low negative pressure state close to the atmospheric pressure. Further, some vehicles are structurally designed in such a manner that the pressure in the constant pressure chamber of the pneumatic booster is easily placed into a low negative pressure state close to the atmospheric pressure for the reason of improving fuel efficiency or the like, depending on the vehicle. As a result, when the spring force of the return spring is set based on a relatively high negative pressure state, this leads to an increase in an invalid pressing force when a braking operation is performed immediately after the vehicle starts running.

Especially, some vehicles include a brake assist apparatus between the master cylinder and a wheel cylinder. The brake assist apparatus is configured to supply a brake hydraulic pressure according to an amount of an operation performed on the brake pedal from a hydraulic source such as a hydraulic pump to the wheel cylinder on the wheel side. These vehicles involve such a drawback that a brake pressing force is changed every time the pressure in the constant pressure chamber of the pneumatic booster is placed into a low negative pressure state, whereby an uncomfortable feeling is provided to a driver of the vehicle.

The present invention has been contrived in consideration of the above-described drawback of the conventional technique, and an object of the present invention is to provide a pneumatic booster and a brake system that allow a weak force to be set as a spring force of a biasing member, and can prevent or reduce a change in a brake pressing force when a braking operation is performed to thereby eliminate or reduce an uncomfortable feeling of a driver of a vehicle.

To achieve the above-described object, a pneumatic booster and a brake system according to the present invention includes:

a valve body coupled to a power piston dividing an inside of a housing into a constant pressure chamber and a variable pressure chamber, and sealed from an atmosphere on a variable pressure chamber side in the housing; and a biasing member disposed in the housing and configured to hiss the valve body toward the variable pressures chamber side, wherein the valve body includes a portion configured to receive a differential pressure between the constant pressure chamber and the atmosphere, on a constant pressure chamber side in the housing.

According to the present invention, it is possible to set a weak force as the spring force of the biasing member for returning the valve body to the variable pressure chamber side when a braking operation is released, and prevent or reduce a change in a brake pressing force when a braking operation is performed to eliminate or reduce an uncomfortable feeling of a driver of the vehicle.

BRIEF DESCRIPTIONS OF DRAWINGS

DESCRIPTION OP EMBODIMENTS

Hereinafter, pneumatic boosters according to embodiments of the present invention will be described in detail with reference to the accompanying drawings, based on an example in which they are employed for a brake system of a four-wheeled automobile.

Figure 1:
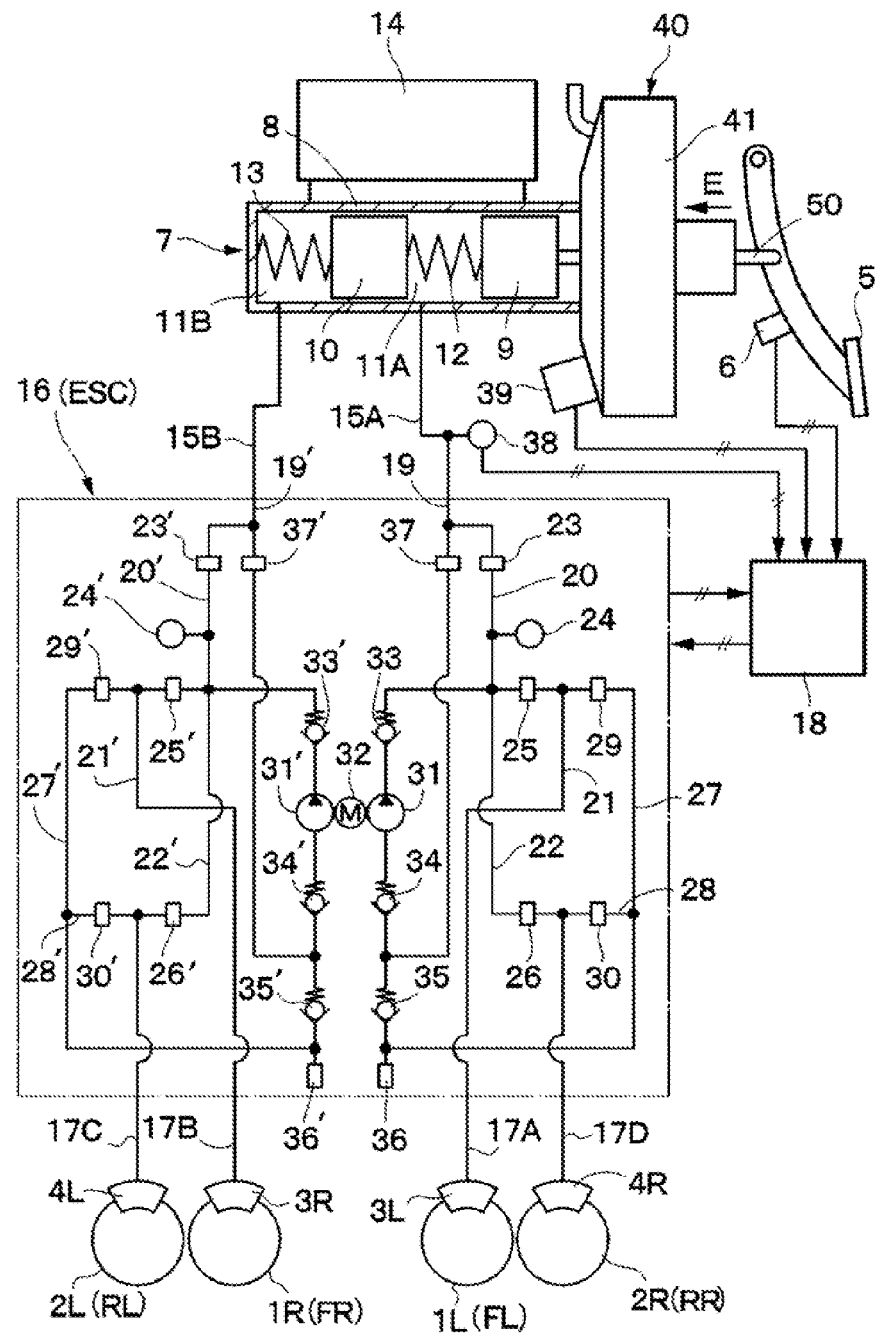
FIG. 1 illustrates a circuit configuration of a brake system of a four-wheeled automobile with a pneumatic booster according to a first embodiment of the present invention mounted thereon.

FIGS. 1 to 4 illustrate a first embodiment of the present invention. In FIG. 1, front left and right wheels 1L and 1R, and rear left and right wheels 2L and 2R are mounted under a vehicle body (not illustrated), which constitutes a main structure of a vehicle. Front wheel-side wheel cylinders 3L and 3R are mounted on the front left and right wheels 1L and 1R, respectively, and rear wheel-side wheel cylinders 4L and 4R are mounted on the rear left and right wheels 2L and 2R, respectively. These wheel cylinders 3L, 3R, 4L and 4R constitute cylinders of hydraulic disk brakes or drum brakes, and function to apply braking forces to the respective wheels (the front wheels 1L and 1R, and the rear wheels 2L and 2R) for each wheel.

A brake pedal 5 is mounted on a front board side of the vehicle body, and this brake pedal 5 is pressed by a driver when the driver brakes the vehicle. A stroke sensor 6 is mounted on the brake pedal 5. This stroke sensor 6 detects an amount of a pressing operation performed on the brake pedal 5 as a stroke amount, and outputs a detection signal therefrom to a control unit 18, which will be described below. The pressing operation performed on the brake pedal 5 is transmitted to a master cylinder 7 via a pneumatic booster 40, which will be described below.

Figure 2:
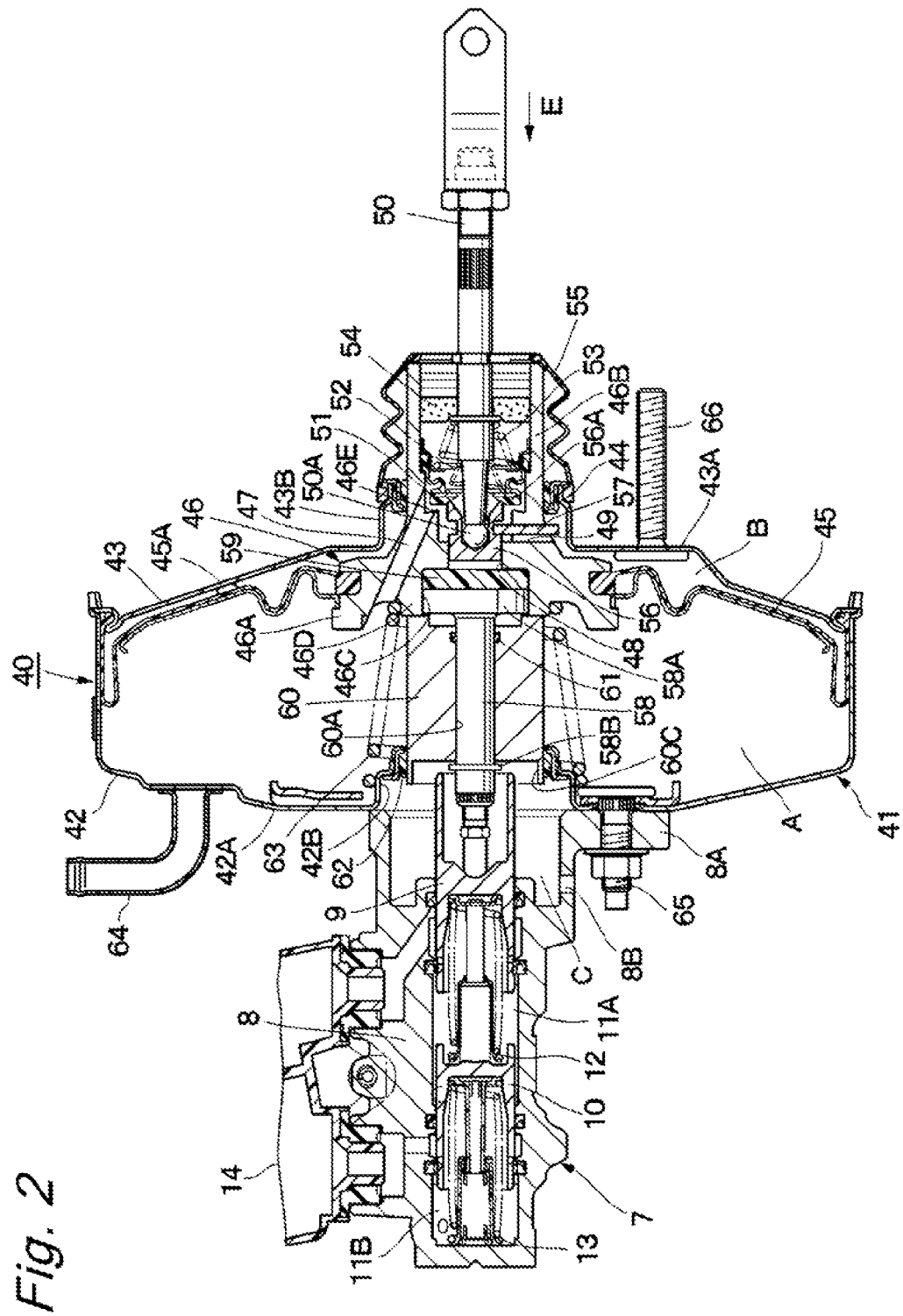
FIG. 2 is a vertical cross-sectional view illustrating the pneumatic booster illustrated in FIG. 1 together with a master cylinder and the like (a part thereof illustrated as an end view or the like).

The master cylinder 7 includes a bottomed cylindrical cylinder main body 8 having one end configured as an opening end and an opposite end configured as a bottom portion and closed. As illustrated in FIG. 2, this cylinder main body 8A includes an attachment flange portion 8A provided on the opening end side at the one end. This attachment flange portion 8A is fixedly attached in a detachable manner to a front shell 42 of the pneumatic booster 40, which will be described below, with use of a plurality of attachment bolts 65 or the like. An air hole 8B is penetratingly formed on the opening end side of the cylinder main body 8 for introducing an external atmospheric pressure into an atmosphere chamber C, which will be described below.

The master cylinder 7 includes the above-described cylinder main body 8, a first piston 9 and a second piston 10, a first hydraulic chamber 11A, a second hydraulic chamber 11B, a first return spring 12, and a second return spring 13. The first piston 9 and the second piston 10 are fittedly inserted in the cylinder main body 8 in a slidable manner, and is arranged so as to be axially displaced in the cylinder main body 8 according to a pressing operation performed on the brake pedal 5. The first hydraulic chamber 11A is defined between the first piston 9 and the second piston 10 in the cylinder main body 8. The second hydraulic chamber 11B is defined between the bottom portion of the cylinder main body 8 and the second piston 10 in the cylinder main body 8. The first return spring 12 is located in the first hydraulic chamber 11A, and is disposed between the first piston 9 and the second piston 10 to bias the first piston 9 toward the opening end side of the cylinder main body 8. The second return spring 13 is located in the second hydraulic chamber 11B, and is disposed between the bottom portion of the cylinder main body 8 and the second piston 10 to bias the second piston 10 toward the first piston 9.

The cylinder main body 8 of the master cylinder 7 generates a hydraulic pressure by brake fluid in the first and second hydraulic chambers 11A and 11B, when the first piston 9 and the second piston 10 are displaced toward the bottom portion of the cylinder main body 8 according to a pressing operation performed on the brake pedal 5. Further, the cylinder main body 8 of the master cylinder 7 releases the hydraulic pressure in the first and second hydraulic chambers 11A and 11B while receiving supply of the brake fluid from a master reservoir 14, when the first piston 9 and the second piston 10 are displaced toward the opening portion of the cylinder main body 8 by the first and second return springs 12 and 13 according to a release of the operation performed on the brake pedal 5. In this case, the master reservoir 14 constitutes a hydraulic fluid tank containing the brake fluid.

The hydraulic pressure generated in the first hydraulic chambers 11A and 11B of the master cylinder 7 is transmitted to a hydraulic supply apparatus 16 (hereinafter referred to as an ESC 16) via, for example, a pair of cylinder-side hydraulic pipes 15A and 15B. This ESC 16 constitutes a brake assist apparatus that compensates for a required sufficient brake hydraulic pressure to supply it to the wheels cylinders 3L, 3R, 4L, and 4R, for example, when the brake hydraulic pressure from the master cylinder 7 is insufficient.

The ESC 16 distributes and supplies the hydraulic pressure from the master cylinder 7 (the first and second hydraulic chambers 11A and 11B) to the wheel cylinders 3L, 3R, 4L, and 4R via brake-side pipe portions 17A, 17B, 17C, and 17D. As a result, a braking force is applied to each wheel (each of the front wheels 1L and 1R and each of the rear wheels 2L and 2R) as described above. The ESC 16 includes respective control valves 23, 23', 25, 25', 26, 26', 29, 29', 30, 30', 37, and 37', an electric motor 32 that drives hydraulic pumps 31 and 31', and the like, which will be described below.

The control unit 18 is a controller for the hydraulic supply apparatus as a control unit for controlling an operation of the ESC 16, and an input side of the control unit 18 is connected to the above-described stoke sensor 6, hydraulic sensors 24 and 24' of the ESC 16, a hydraulic sensor 38 that will be described below, a negative pressure sensor 39, and the like. An output side of the control unit 18 is connected to the respective control valves 23, 23', 25, 25', 26, 26', 29, 29', 30, 30', 37, and 37', the electric motor 32, and the like, which will be described below.

The control unit 18 drives and controls the respective control valves 23, 23', 25, 25', 26, 26', 29, 29', 30, 30', 37, and 37', the electric motor 32, and the like of the ESC 16. By this operation, the control unit 18 performs control for reducing, maintaining, increasing, or applying the brake hydraulic pressure to be supplied from the brake-side pipe portions 17A to 17D to the wheel cylinders 3L, 3R, 4L and 4R for each of the wheel cylinders 3L, 3R, 4L and 4R individually.

In other words, the control unit 18 can realize the following types of control, controls (a) to (h) and the like by controlling the operation of the ESC 16.

(a) braking force distribution control for appropriately distributing a braking force to each of the wheels according to a vertical load and the like, for example, when the vehicle is braked;

(b) anti-lock brake control for preventing the wheel from being locked by automatically adjusting a braking force applied to each wheel when the vehicle is braked;

(c) vehicle stabilization control for stabilizing a behavior of the vehicle by detecting a skid of the wheel while the vehicle is running, and preventing understeer and oversteer while appropriately automatically controlling a braking force to be applied to each wheel regardless of an amount of an operation performed on the brake pedal 5;

(d) hill start assist control for assisting a start on a slope (especially, an upslope) by holding a braked state;

(e) traction control for preventing the wheel from idly spinning, for example, when the vehicle starts running;

(f) vehicle following control for maintaining a predetermined distance to a vehicle running ahead;

(g) traffic lane departure prevention control for maintaining the vehicle within a traffic lane; and (h) obstacle avoiding control for avoiding a crash with an obstacle in front of the vehicle or behind the vehicle.

Next, a specific configuration of the ESC 16, which is the hydraulic supply apparatus, will be described in detail with reference to FIG. 1. The ESC 16 includes two hydraulic circuits, a first hydraulic system 19 connected to one of output ports of the master cylinder 1 (i.e., connected to the cylinder-side hydraulic pipe 15A) and supplying the hydraulic pressure to the wheel cylinder 3L on the front left wheel (FL) side and the wheel cylinder 4R on the rear right (RR) side, and a second hydraulic system 19' connected to the other of the output ports (i.e., connected to the cylinder-side hydraulic pipe 15B) and supplying the hydraulic pressure to the wheel cylinder 3R on the front right wheel (FR) side and the wheel cylinder 4L on the rear left wheel (RL) side. The first hydraulic system 19 and the second hydraulic system 19' are configured similarly to each other, whereby in the following description, only the first hydraulic system 19 will be described, and respective components of the second hydraulic system 19' will not be described redundantly while being indicated by a mark "'" added to reference numerals.

The ESC 16 includes a brake pipeline 20 connected to a distal end side of the cylinder-side hydraulic pipe 15A. The brake pipeline 20 is branched into two pipeline portions, a first pipeline portion 21 and a second pipeline portion 22, and is connected to the respective wheel cylinders 3L and 4R. The brake pipeline 20 and the first pipeline portion 21 constitute a pipeline for supplying the hydraulic pressure to the wheel cylinder 3L. The brake pipeline 20 and the second pipeline portion 22 constitute a pipeline for supplying the hydraulic pressure to the wheel cylinder 4R.

The brake hydraulic supply control valve 23 and the hydraulic sensor 24 are disposed in the brake pipeline 20 in series. The brake hydraulic supply control valve 23 includes a normally-opened electromagnetic switching valve for opening and closing the brake pipeline 20. The hydraulic sensor 24 detects a hydraulic pressure generated in the first and second pipeline portions 21 and 22 on a downstream side of the supply control valve 23 in the brake pipeline 20 as a hydraulic pressure of the wheel cylinder side corresponding to the wheel cylinders 3L and 4R.

The pressure increase control valve 25 is disposed in the first pipeline portion 21, and this pressure increase control valve 25 includes a normally-opened electromagnetic switching valve for opening and closing the first pipeline portion 21. The pressure increase control valve 26 is disposed in the second pipeline portion 22, and this pressure increase control valve 26 includes a normally-opened electromagnetic switching valve for opening and closing the second pipeline portion 22. On the other hand, the ESC 16 includes a first pressure reduction pipeline 27 and a second pressure reduction pipeline 28 respectively connecting the wheel cylinders 3L and 4R and a hydraulic control reservoir 36. The pressure reduction control valves 29 and 30 are disposed in these first and second pressure reduction pipelines 27 and 28, respectively. The pressure reduction control valves 29 and 30 include normally-closed electromagnetic switching valves for opening and closing the first and second pressure reduction pipelines 27 and 28, respectively.

Further, the ESC 16 includes the hydraulic pump 31 as a hydraulic generation unit, which is a hydraulic source, and this hydraulic pump 31 is rotationally driven by the electric motor 32. The electric motor 32 is driven by receiving power supply from the control unit 18, and stops rotating together with the hydraulic pump 31 upon a stop of the power supply. A discharge side of the hydraulic pump 31 is connected to a position downstream of the supply control valve 23 in the brake pipeline 20 (i.e., a position where the brake pipe line 20 is branched into the first pipeline 21 and the second pipeline 22) via a check valve 33. A suction side of the hydraulic pump 31 is connected to the hydraulic control reservoir 33 via check valves 34 and 35.

The hydraulic control reservoir 36 is provided to temporarily store excessive brake fluid. The hydraulic control reservoir 36 temporarily stores excessive brake fluid flowing out from cylinder chambers (not illustrated) of the wheel cylinders 3L and 4R during not only the ABS control of the brake system but also other types of brake control. The suction side of the hydraulic pump 31 is connected to the cylinder-side hydraulic pipe 15A of the master cylinder 7 (i.e., a position upstream of the supply control valve 23 in the brake pipeline 20) via the check valve 34 and the pressure application control valve 37, which is a normally-closed electromagnetic switching valve.

Due to this configuration, the ESC 16 directly supplies the hydraulic pressure generated in the master cylinder 7 during a normal operation that, is per former according to a driver's braking operation, to the wheel cylinders 3L and 4R via the brake pipeline 20 and the first and second pipeline portions 21 and 22. For example, during execution of the anti-skid control or the like, the control unit 18 closes the pressure increase control valve 25 or 26 to maintain the hydraulic pressure in the wheel cylinder 3L or 4R. When the hydraulic pressure in the wheel cylinder 3L or 4R is supposed to be reduced, the control unit 18 opens the pressure reduction control valve 29 or 30 to discharge the hydraulic pressure in the wheel cylinder 3L or 4R as if releasing it into the hydraulic control reservoir 36.

Respective operations of the control valves 23, 23', 25, 25', 26, 26', 29, 29', 30, 30', 37, and 37' included in the ESC 16, and the electric motor 32 that drives the hydraulic pumps 31 and 31' are controlled according to a control signal output from the control unit 18 by a predetermined procedure.

For example, the control unit IS increases the hydraulic pressure to be supplied to the wheel cylinder 31 or 4R to perform the stabilization control (electronic stability control) or the like while the vehicle is running. At this time, the control unit 18 actuates the hydraulic pump 31 by the electric motor 32 with the supply control valve 23 closed, and supplies brake fluid discharged from the hydraulic pump 31 to the wheel cylinder 3L or 4R via the first or second pipeline portion 21 or 22. In this case, because the pressure application control valve 37 is opened, the brake fluid in the master reservoir 14 is supplied from the master cylinder 7 to the suction side of the hydraulic pump 31.

At this time, the control unit IS controls the operations of the supply control valve 23, the pressure increase control valve 25 or 26, the pressure reduction control valve 29 or 30, the pressure application control valve 37, and the electric motor 32 (i.e., the hydraulic pump 31) based on vehicle driving information and the like. By this control, the hydraulic pressure to be supplied to the wheel cylinder 3L or 4R can be maintained, reduced, or increased appropriately. This realizes execution of brake control such as the above-described braking force distribution control, vehicle stabilization control, brake assist control, anti-skid control, traction control, and hill start assist control.

On the other hand, in a normal braking mode performed with the electric motor 32 (i.e., the hydraulic pump 31) stopped, the control unit 18 opens the supply control valve 23 and the pressure increase control valves 25 and 26, and closes the pressure reduction control valves 29 and 30 and the pressure application control valve 37. In this state, a brake hydraulic pressure is generated in the first and second hydraulic chambers 11A and 11B, when the first piston 9 and the second piston 19 of the master cylinder 7 are axially displaced in the cylinder main body 8 according to a pressing operation performed on the brake pedal 5. This brake hydraulic pressure is supplied from the cylinder-side hydraulic pipe 15A into the wheel cylinders 3L and 4R via the first hydraulic system 19 of the ESC 16 and the brake-side pipe portions 17A and 17D.

In a brake assist mode performed when a negative pressure in a negative pressure chamber A of the pneumatic booster 40, which will be described below, is insufficient, the control unit 18 opens the pressure application control valve 37 and the pressure increase control valves 25 and 26, and appropriately opens and closes the supply control valve 23 and the pressure reduction control valves 29 and 30. While keeping this state, the control unit 18 actuates the hydraulic pump 31 by the electric motor 32, and supplies the brake fluid discharged from the hydraulic pump 31 to the wheel cylinders 3L and 4R via the first and second pipeline portions 21 and 22. This allows the wheel cylinders 3L and 4R to generate braking forces with use of the brake fluid discharged frost the hydraulic pump 31 together with the brake hydraulic pressure generated in the master cylinder 7.

A known hydraulic pump such as a plunger pump, a trochoid pump, and a gear pump can be used as the hydraulic pump 31, but it is desirable that a gear pump is used as the hydraulic pump 31 in consideration of mountability to the vehicle, a silence operation, pump efficiency, and the like. A known motor such as a DC motor, a DC brushless motor, and an AC motor can be used as the electric motor 32, but in the present embodiment, a DC motor is used as the electric motor 32 in consideration of mountability to the vehicle and the like.

Further, characteristics of the respective control valves of the ESC 16 can be appropriately set according to a use situation. However, among those valves, the supply control valve 23 and the pressure increase control valves 25 and 26 are set as normally-opened valves, and the pressure reduction control valves 29 and 30 and the pressure application control valve 37 are set as normally-closed valves. This configuration allows the hydraulic pressure to be supplied from the master cylinder 7 to the wheel cylinders 3L and 4R even when a control signal is not issued form the control unit 18. Therefore, this configuration is desirable in light of a fail-safe and control efficiency of the brake system.

The hydraulic sensor 38 is disposed at an intermediate position of the cylinder-side hydraulic pipe ISA between the master cylinder 7 and the ESC 16. This hydraulic sensor 38 detects a hydraulic pressure generated in the cylinder-side hydraulic pipe 15A on an upstream side of the ESC 16 as the hydraulic pressure in the first hydraulic chamber 11A of the master cylinder 7. On the other hand, the negative pressure sensor 39 detects a pressure in the negative pressure chamber A of the pneumatic booster 40, which will be described below. The control unit 18 performs the above-describe brake assist mode according to input signals from these hydraulic sensor 38, negative pressure sensor 39, and stroke sensor 6.

Next, the pneumatic booster 40 employed in the first embodiment will be described with reference to FIGS. 2 and 3. This pneumatic booster 40 includes a negative pressure booster disposed between the brake pedal 5 and the master cylinder 7, and transmits a pressing force to the master cylinder 7 while boosting this pressing force and also provides an appropriate response to the pressing to the driver when a pressing operation is performed on the brake pedal 5.

A housing 41 of the pneumatic booster 40 generally includes a front shell 42 and a rear shell 43, and the front shell 42 and the rear shell 43 are fixedly attached to each other on outer circumferential sides thereof in an air-tight state. A cylindrical portion 42B hollowed or concaved for containing a part of the master cylinder 7 (for example, a one-end side of the piston 9) is formed at a central portion of the front wall 42A of the front shell 42.

The reel shell 43 includes a rear cylindrical portion 43B provided so as to protrude axially outwardly from a rear wall 43A, which serves as a surface attached to the vehicle (not illustrated). A seal member 44 is provided between a protruding-side end of this rear cylindrical portion 43B and an outer circumferential surface of a valve body 46 (a small-diameter cylindrical portion 46B), which will be described below, for allowing a variable pressure chamber B, which will be described below, to be maintained in an air-tight state regardless of an axial displacement of the valve body 46.

A power piston 45 including, for example, a diaphragm, is disposed in the housing 41. This power piston 43 is fixed on its outer circumferential side between the front shell 42 and the rear shell 43, and divides the inside of the housing 41 into the negative pressure chamber A, which is a constant pressure changer, and the variable pressure chamber B. The power piston 45 includes a protruding portion 45A provided at a radially intermediate position thereof. This protruding portion 45A is located at a position facing the rear wall 43A of the rear shell 43 in a front-rear direction. When the valve body 46, which will be described below, returns to an initial position illustrated in FIGS. 2 and 3, a return position of the valve body 46 is regulated by abutment of the protruding portion 45A of the power piston 45 against the rear wall 43A of the rear shell 43.

The valve body 46 is disposed so as to be able to be axially displaced in the housing 41, and the small-diameter cylindrical portion 46B is inserted through the rear cylindrical portion 43B of the rear shell 43. This valve body 46 is made from a resin material such as PET (polyethylene terephthalate) and phenolic resin. The valve body 46 includes a main body portion 46A having an outer circumferential side coupled (fixedly attached) to an inner circumferential side of the power piston 45 in the housing 41, and the cylindrical small-diameter cylindrical portion 46B formed integrally with the main body portion 46A and extending from the rear cylindrical portion 43B of the rear shell 43 out of the housing 41. This small-diameter cylindrical portion 46B constitutes a portion of the valve body 46 located in the variable pressure chamber B in the housing 41, and the small-diameter cylindrical portion 46B is formed so as to have an outer diameter dimension D1 as illustrated in FIG. 3.

The valve body 46 is axially displaced in the housing 41 according to a displacement of the power piston 45, and the valve body 46 is sealed in the negative pressure chamber A from an external atmosphere via a cylindrical member 60 and a seal member 62, which will be described below. A circular bottomed hole portion 46C positioned on a central side of the main body portion 46A, and a cylindrical protruding portion 46D positioned on an outer circumferential side of this bottomed hole portion 46C and axially protruding toward an output rod 58, which will be described below, are integrally formed at the valve body 46. A plunger fittedly inserted hole 48 is formed on a bottom side of the bottomed hole portion 46C.

On the other hand, a communication passage 47, as a vacuum passage located on a radially outer side of the cylindrically protruding portion 46D and axially obliquely extending toward the small-diameter cylindrical portion 46B, is formed through the main body portion 46A of the valve body 46. An annular valve seat portion 46E is formed at the small-diameter cylindrical portion 46B of the valve body 46 so as to be located on an opening end side of the communication passage 47, and a poppet valve body 51, which will be described below, is separated from and seated on this valve seat portion 46E. The valve seat portion 46E of the valve body 46 constitutes a valve unit for establishing and blocking communication between the variable pressure chamber B and the negative pressure chamber A together with the poppet valve body 51, a plunger 56, and the like.

The plunger fittedly inserted hole 48 axially extending from a position of the valve seat portion 46E toward the bottomed hole portion 46C is formed through the valve body 46, and the plunger 56, which will be described below, is fittedly inserted in this plunger fittedly inserted portion 43 in a slidable manner. Radially extending another communication passage 49 located on a proximal end side of the small-diameter cylindrical portion 46B (a boundary between the main body portion 46A and the small-diameter cylindrical portion 46B) is formed through the valve body 46. This communication passage 49 constitutes an atmosphere passage, and establishes constant communication between the plunger fittedly inserted hole 48 and the variable pressure chamber B. The communication passage 49 also functions as a key insertion hole with a stop key 57, which will be described below, inserted inside the communication passage 49.

An input rod 50 is disposed so as to be inserted in the small-diameter cylindrical portion 46B of the valve body 46. A one-end side of this input rod 50 that protrudes out of the small-diameter cylindrical portion 46B is coupled to the brake pedal 5 (refer to FIG. 1) of the vehicle. The input rod 50 is pushed in a direction indicated by an arrow E illustrated in FIGS. 2 and 3, i.e., pushed in toward the master cylinder 7 when a braking operation is performed. Further, a spherical portion 50A is integrally formed on an opposite-end side of the input rod 50, and the spherical portion 50A is swingably coupled to the plunger 56, which will be described below, with use of the swaging or staking method or the like.

The poppet valve body 51 is disposed so as to be able to open and close the valve in the small-diameter cylindrical portion 46B of the valve body 46. This poppet valve body 51 is made from an elastic material and is formed into a generally cylindrical shape, and an one-end side thereof is fixed to an inner circumferential wall of the small-diameter cylindrical portion 46B via, for example, a return spring 53, which will be described below. An opposite-end side of the poppet valve body 51 is constantly biased by a weak spring 52 toward an abutment portion 56A of the plunger 56, which will be described below. Due to this configuration, the poppet valve body 51 is configured to be separated from and seated on the abutment portion 56A of the plunger 56 and/or she valve seat portion 46E of the valve body 46.

The return spring 53 is disposed in an elastically deformed state between the small-diameter cylindrical portion 46B of the valve body 46, and the input rod 50. This return spring 53 constantly biases the input rod 50 in a reverse direction of the direction indicated by the arrow E in FIG. 2. When the brake pedal 5 is returned, the return spring 53 pushes the input rod 50 in the same direction, as the valve body 46 until the valve body 46 returns to the initial position illustrated in FIGS. 2 and 3 in the housing 41. As a result, when the brake pedal 5 is returned, the poppet valve body 51 is separated from the valve seat portion 46E of the valve body 46 by the biasing force of the return spring 53 via the input rod 50 and the plunger 56.

A filter 54 mounted in the small-diameter cylindrical portion 46B of the valve body 46 purifies air as working gas introduced from outside the housing 41 into the small-diameter cylindrical portion 46B, and prevents dust and the like from entering the housing 41. A protection boot 55 protects a protruding-end side of the small-diameter cylindrical portion 46B of the valve body 46 from external dust and the like. This protection boot 55 is made from an elastic material and is formed as a bellows-like cylindrical body, and a one-end side thereof is attached to an intermediate portion of the input rod 50. An opposite-end side of the protection boot 55 is attached to a distal end side of the rear cylindrical portion 43B of the rear shell 43, and protects an outer circumferential surface of the small-diameter cylindrical portion 46B sliding in the rear cylindrical portion 43B from external dust and the like.

The plunger 56 is fittedly inserted in the plunger fittedly inserted hole 43 of the valve body 46 in a slidable manner. A one axial side of this plunger 56 is formed as a cylindrical valve body, and axially protrudes in the small-diameter cylindrical portion 46B of the valve body 46. The spherical portion 50A of the input rod 50 is fixed to a radially inner side of the plunger 56 on a protruding-end side of the plunger 56 with use of the swaging or staking method or the like. Due to this fixation, the plunger 56 is axially displaced integrally or together with the input rod 50.

Further, the abutment portion 56A, as an annular valve seat formed so as to be smaller in diameter than the valve seat portion 46E of the valve body 46, is provided on the protruding-end (one end) side of the plunger 56. This abutment portion 56A establishes and blocks communication between the atmospheric pressure in the small-diameter cylindrical portion 46B and the communication passage 49 by being separated from and seated on the poppet valve body 51. Due to this operation, the abutment portion 56A of the plunger 56 constitutes a valve unit together with the valve seat portion 46E of the valve body 46 and the poppet valve body 51.

In other words, the abutment portion 56A of the plunger 56 establishes and blocks communication between the abutment portion 56A and the poppet valve body 51, and also establishes and blocks communication between the valve seat portion 46E and the poppet valve body 51 according to a positional relationship between the abutment portion 56A and the valve seat portion 46b of the valve body 46. In this manner, the plunger 56 functions to, for example, introduce the air as the working gas into the variable pressure chamber B to thereby generate a differential pressure between the negative pressure chamber A and the variable pressure chamber B, by moving integrally or together with the input rod 50 (being axially displaced). Further, an annular groove 56B is formed on an outer circumferential side of the plunger 56 at a position corresponding to the other communication passage 49 of the valve body 46, and the stop key 57, which will be described below, is attached in the annular groove 56B in an engaged state.

The stop key 57 regulates a return position of the plunger 56. This stop key 57 is formed as a generally rectangular flat plate, and a distal end side thereof is radially inserted in the valve body 46 via the communication passage 49. The distal end side of the stop key 57 is engaged with the annular groove 56B of the plunger 56 in a loosely fitted state. Due to this engagement, the stop key 57 regulates the return position of the plunger 56 with respect to the valve body 46 when the input rod 50 is returned, as illustrated in FIGS. 2 and 3.

The output rod 58 outputs an axial displacement of the valve body 46 out of the housing 41. A flange portion 58A having a large diameter is formed at this output rod 58 on a one end side thereof. This flange portion 58A is fittedly inserted in the bottomed hole portion 46C of the valve body 46 via a reaction disk 59, which will be described below. On she other hand, a distal end side (an opposite axial side) of the output rod 58 protrudes in the cylindrical portion 42B of the front shell 42 out of the housing 41, and is in abutment with the first piston 9 of the master cylinder 7 so as to be separable from and contactable with the first piston 9, as illustrated in FIGS. 2 and 3.

When the input rod 50 is pushed in axially (in the direction indicated by the arrow E, toward the master cylinder 7) by the brake pedal 5, the output rod 58 is axially pushed together with the valve body 46 while boosting the push-in force applied to the input rod 50 (a pressing force applied to the brake pedal 5). As a result, the distal end side (the opposite axial side) of the output rod 58 axially thrusts the pistons 9 and 10 of the master cylinder 7 by a large push force.

The reaction disk 59 as a reaction member is disposed between the bottomed hole portion 46C of the valve body 46 and the flange portion 58A of the output rod 53. This reaction disk 59 is made from an elastic resin material such as rubber and is formed into a disk shape, and transmits an axial thrust force, which is generated at the power piston 45 with the aid of a pressure difference between the negative pressure chamber A and the variable pressure chamber B as will be described below and transmitted to the valve body 46, to the output rod 58.

At this time, the reaction disk 59 is elastically deformed between the bottomed hole portion 46C of the valve body 46 and the flange portion 58A of the output rod 58. At this time, a part of the reaction disk 59 (a central portion) axially bulges out of the bottomed hole portion 46C toward the plunger fittedly inserted hole 48 to a position that allows the part of the reaction disk 59 to abut against an end surface of the plunger 56. As a result, the reaction disk 59 receives a hydraulic reaction force of the master cylinder 7, which is transmitted via the output rod 58, at the flange portion 58A, and transmits a part of this reaction force to the plunger 56 and the input rod 50. This transmission allows the driver operating the brake pedal 5 to feel a response to the pressing operation.

The cylindrical member 60 is disposed on an outer circumferential side of the output rod 58. This cylindrical member 60 includes a cylindrical body formed so as to have an outer diameter dimension D2 generally equal to the diameter of the small-diameter cylindrical portion 46B of the valve body 46 (the outer diameter dimension D1 illustrated in FIG. 3), and a radially inner side thereof forms a fittedly inserted hole 60A in which the output rod 58 is fittedly inserted. An O-ring 61 as a seal member seals between the fittedly inserted hole 60A of the cylindrical member 60 and the output rod 58, and blocks a flow of the atmosphere between the negative pressure chamber A and the atmosphere chamber C. Further, as best illustrated in FIG. 3, an annular abutment portion 60B in abutment with the cylindrical protruding portion 46D of the valve body 46 is provided on a one axial side of the cylindrical member 60.

On the other hand, a circular recessed portion 60C is formed on an end surface of the cylindrical member 60 on an opposite axial side thereof, and the one-end side of the piston 9 of the master cylinder 7 is inserted in this recessed portion 60C with a space formed therebetween. A retaining ring 58B (a detachment prevention member), which is detachably provided on the outer circumferential side of the output rod 58, is disposed in the recessed portion 60C of the cylindrical member 60. The cylindrical member 60 is maintained in a state prevented from being detached from the output rod 58 by this retaining ring 58B.

A seal member 62, which seals the negative pressure chamber a in the housing 41 from the external atmosphere, is provided between an outer circumferential surface of the cylindrical member 60 and the cylindrical portion 42B of the front shell 42. This seal member 62 maintains the negative pressure chamber A in an air-tight state regardless of an axial displacement of the cylindrical member 60 (the output rod 58). When the valve body 46 is located at the initial position (a braking release positron) as illustrated in FIGS. 2 and 3, the retaining ring 58 of the output rod 58 and the seal member 62 are located at positions generally radially facing each other.

The cylindrical member 60 constitutes a portion of the valve body 46 that receives a differential pressure between the negative pressure chamber A and the atmosphere in the negative pressure chamber A in the housing 41, and causes the atmospheric pressure from the atmosphere chamber C, which will be described below, to be applied to the cylindrical protruding portion 46D of the valve body 46. Therefore, the O-ring 61 seals between the output rod 58 and the fittedly inserted hole 60A of the cylindrical member 60, and the seal member 62 seals between the outer circumferential surface of the cylindrical member 60 and the cylindrical portion 42B of the front shell 42.

A return spring 63 as a biasing member is disposed while being elastically deformed, i.e., while a set load is applied thereto, between the front wall 42A of the front shell 42 and the cylindrical protruding portion 46D of the valve body 46. This return spring 63 constantly biases the valve body 46 toward she initial position (the braking release position) illustrated in FIGS. 2 and 3. The return spring 63 is realized with use of a spring that exerts a weaker spring force than a conventional spring for a reason that will be described below. A weak force can be set as the biasing force of the return spring 63 for returning the valve body 46 into the variable pressure chamber B when a braking operation is released. The return spring 63 is configured to reduce an invalid pressing force when a braking operation is performed while the pressure in the negative pressure chamber A is a low negative pressure, or while the pressure in the negative pressure chamber A is equal to the atmospheric pressure.

Figure 3:
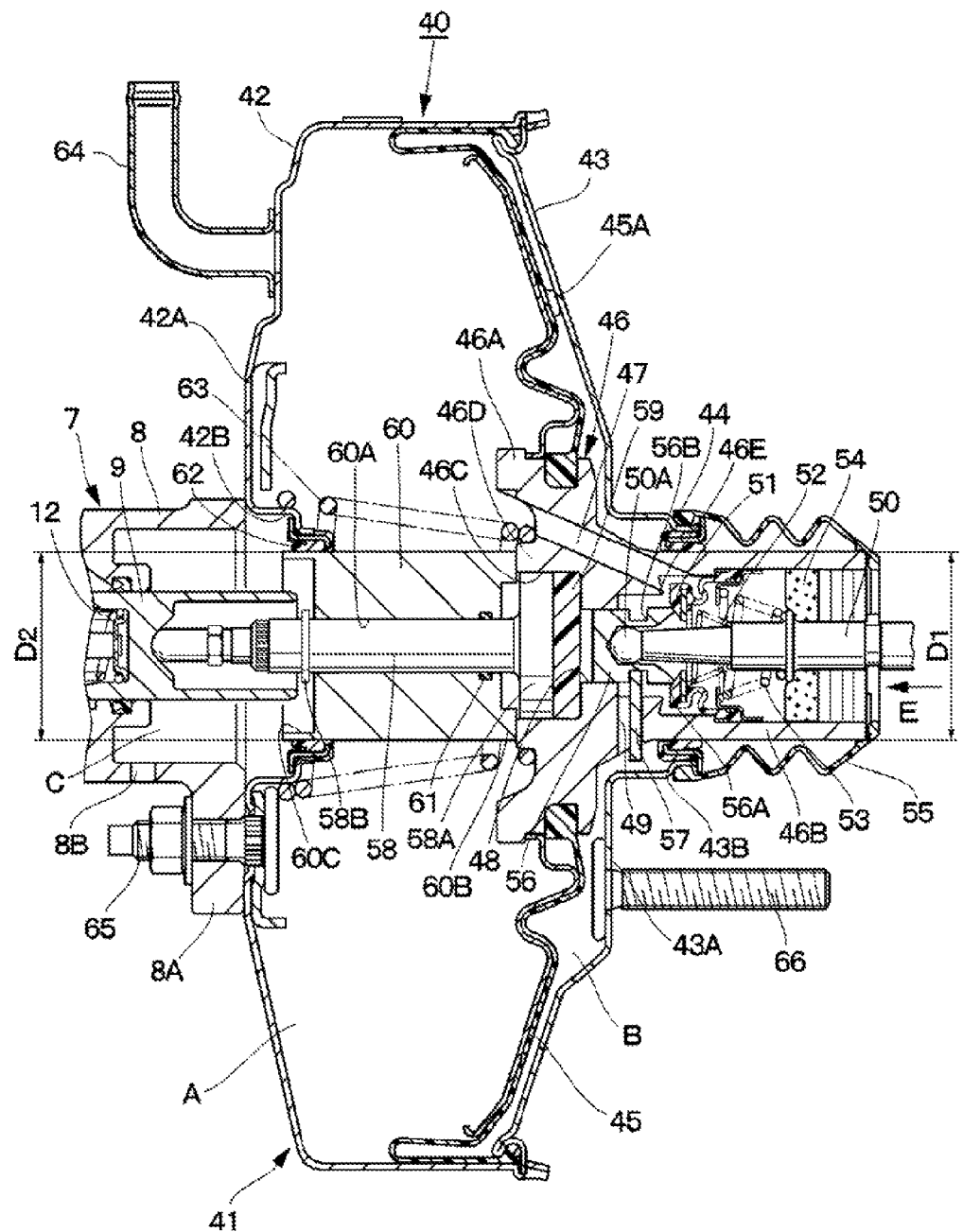
FIG. 3 illustrates a vertical cross-sectional view illustrating the pneumatic booster illustrated in FIG. 2 in an enlarged manner (a part thereof illustrated as an end view or the like).

More specifically, the cylindrical member 60 is formed in such a manner that the outer diameter dimension D2 thereof is generally equal to the outer diameter of the small-diameter cylindrical portion 46B of the valve body 46 (the outer diameter dimension D1 illustrated in FIG. 3). Therefore, the valve body 46 can be set in such a manner that a pressure receiving area to the atmospheric pressure received by the small-diameter cylindrical portion 46B in the variable pressure chamber B in the housing 41 generally matches a pressure receiving area to the atmospheric pressure received by the valve body 46 via the cylindrical member 60 in the atmosphere chamber C, which will be described below.

Assume that FMC represents a set load by the return springs 12 and 13 of the master cylinder 7, Fs represents the spring force of the return spring 63, and R represents a resistance of the cylindrical member 60 against a sliding movement due to the seal member 62. Further, assuming that Fp represents the spring force of the weak spring 52 biasing the poppet valve body 51 in a valve-closing direction, and Rv represents the spring force of the return spring 53 disposed between the small-diameter cylindrical portion 46B of the valve body 46 and the input rod 50, the set load FMC of the master cylinder 7, the spring force Fs of the return spring 63, the sliding resistance R, the spring force Fp of the weak spring 52, and the spring force Fv of the return spring 53 are set so as to satisfy a relationship expressed by the following expression, an expression 1.

$$F_{MC}+F_S+R>F_p+F_v \qquad \text{[EXPRESSION 1]}$$

Therefore, the valve body 46 located at the initial position (the braking release position) as illustrated in FIGS. 2 and 3 is not axially displaced until the poppet valve body 51 abuts against the valve seat portion 46E of the valve body 46 to block the communication passage 47, even when the input rod 50 is pushed in the direction indicated by the arrow E according to a pressing operation performed on the brake pedal 5 so that the plunger 56 is axially displaced together with the input rod 50. The valve body 46 has an axial stroke toward the negative pressure chamber A together with the input rod 50, when the abutment portion 56A of the plunger 56 is separated from the poppet valve body 51 so that communication starts being established between the passage 49 and the atmosphere via the small-diameter cylindrical portion 46B of the valve body 46.

A negative pressure introduction pipe 64 is disposed at the front shell 42. The negative pressure introduction pipe 64 is a pipe bent into an L shape or the like, and is connected to an intake manifold of an engine for the automobile via a check valve (any of them are not illustrated) or the like. The negative pressure introduction pipe 64 guides a negative pressure generated in the intake manifold when the engine is in operation into the negative pressure chamber A, thereby reducing the pressure in the negative pressure chamber A to a lower pressure than the atmospheric pressure. Further, the check valve is closed when the pressure in the negative pressure chamber A is lower than the pressure in the intake manifold to maintain the pressure state in the negative pressure chamber A.

The master cylinder 7 is detachably attached to the front wall 42A of the front shell 42 with use of the plurality of attachment bolts 65 (only one of them is illustrated). These attachment bolts 65 are fasteners for fixing the attachment flange portion 8A provided on the opening-end side of the cylinder main body 8 to the front wall A of the front shell 42. The atmosphere chamber C is defined around the first piston 9 between the opening-end side of the cylinder main body 8 and the cylindrical portion 42B of the front shell 42, and this atmosphere chamber C is in communication with the external atmosphere via the air hole 42B of the cylinder main body 8. Farther, the negative pressure chamber A in the housing 41 (in the front shell 42) is sealed from the atmosphere chamber C by the O-ring 61 and the seal member 62 in an air-tight manner.

On the other hand, a plurality of other attachment bolts 66 (only one of them is illustrated) is disposed on the rear wall 43A of the rear shell 43. These attachment bolts 66 are fasteners for detachably attaching the entire housing 41 including the rear shell 43 to an inner wall of an engine room or the like of the vehicle.

The brake system of the vehicle for which the pneumatic booster 40 according to the first embodiment is employed is configured in the above-described manner, and an operation thereof will be described next.

First, when the driver of the vehicle performs a pressing operation on the brake pedal 5 with the inside of the negative pressure chamber A in the housing 41 maintained in a negative pressure state sufficiently lower than the atmospheric pressure, the input rod 50 is pushed in by this operation in the direction indicated by the arrow E, and the plunger 56 is also axially displaced integrally wish the input rod 50. When the plunger 56 is displaced in the same direction, the poppet valve body 51 is displaced according thereto until it reaches a position where the poppet valve body 51 abuts against the valve seat portion 46E of the valve body 46.

At this time, the communication passage 47 of the valve body 46 is blocked to the variable pressure chamber B, and the communication is blocked between the negative pressure chamber A and the variable pressure chamber B. Further, the poppet valve body 51 is prevented from being further displaced by the abutment against the valve seat portion 46E. On the other hand, the plunger 56 is displaced integrally with the input rod 50, whereby the annular abutment portion 56A of the plunger 56 is separated from the poppet valve body 51. Therefore, the atmospheric pressure is introduced from the inside of the small-diameter cylindrical portion 46B of the valve body 46 into the variable pressure chamber B in the housing 41 via the communication passage 49, whereby a pressure difference is made between the negative pressure chamber A and the variable pressure chamber B.

When the driver continues performing the pressing operation on the brake pedal 5 in this state, the input (the push-in force) to the input rod 50 is boosted due to the pressure difference between the variable pressure chamber B and the negative pressure chamber A. The valve body 46 advances toward the negative pressure chamber A by the boosted force, and a thrust force at this time is transmitted to the output rod 58 via the reaction disk 59. As a result, the first and second pistons 9 and 10 of the master cylinder 7 are axially pushed within the cylinder main body 8 by the output rod 58 of the pneumatic booster 40.

Therefore, a brake hydraulic pressure corresponding to the stoke of the output rod 58 (i.e., corresponding to an amount by which the first and second pistons 9 and 10 are slidably displaced) is generated in the master cylinder 7 (i.e., in the first and second hydraulic chambers 11A and 11B), and this brake hydraulic pressure is distributed and supplied to the wheel cylinders 3L, 3B, 4L and 4R via the cylinder-side hydraulic pipes 15A and 15B, the hydraulic systems 19 and 19' in the ESC 16, and the brake-side pipe portions 17A, 17B, 17C, and 17D. As a result, a braking force is applied to each of the wheels (each of the front wheels 1L and 1R, and each of the rear wheels 2L and 2R) of the vehicle.

Figure 4:
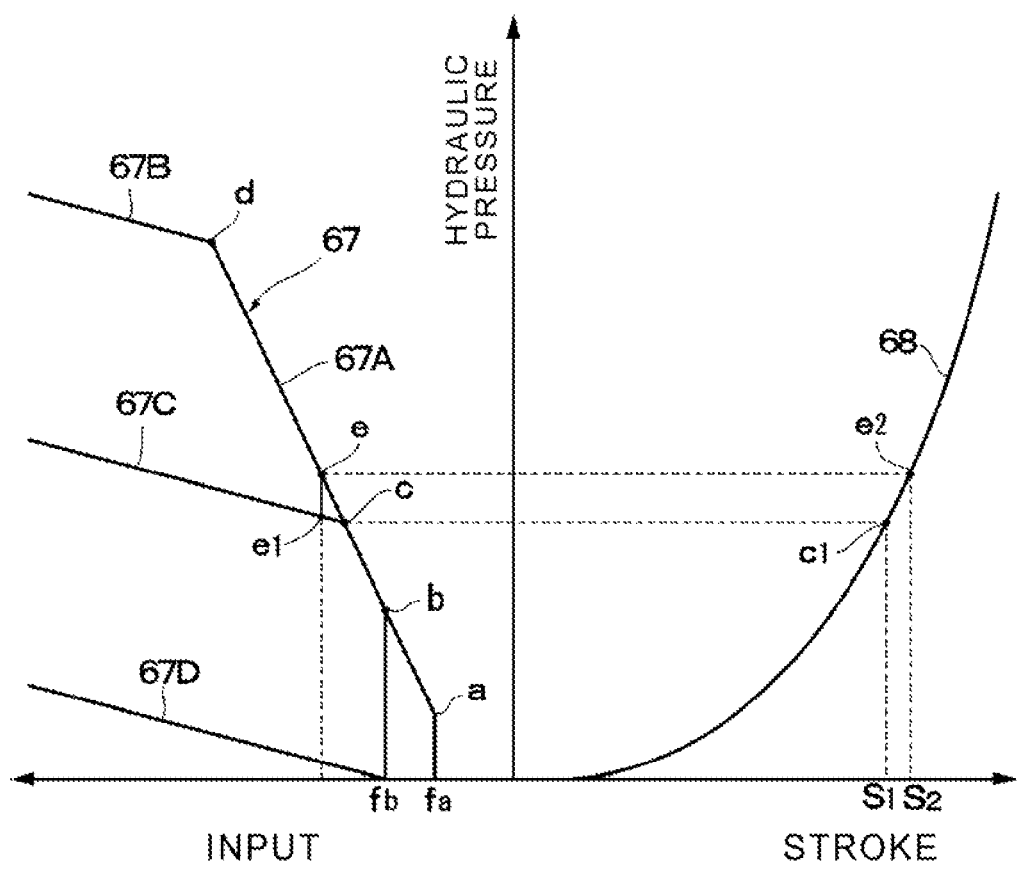
FIG. 4 illustrates characteristic lines chat indicate a relationship among an input, a stroke, and a brake hydraulic pressure of the pneumatic booster.

Now, a characteristic line 67 illustrated in FIG. 4 indicates a relationship between the input applied to the input rod 50 (i.e., the pressing force applied to the brake pedal 5) when the vehicle is braked, and the brake hydraulic pressure. Further, a characteristic line 68 indicates a relationship between the stroke of the input rod 50 (i.e., the amount of the pressing operation performed on the brake pedal 5) when the vehicle is braked, and the brake hydraulic pressure.

As indicated by the characteristic line 67 illustrated in FIG. 4, when the input (the pressing force) applied to the input rod 50 reaches an input value fa, the abutment portion 56A of the plunger 56 is separated from the poppet valve body 51, whereby a pressure difference is generated between the negative pressure chamber A and the variable pressure chamber B. As a result, the valve body 46 advances, and the thrust force at this time is transmitted to the output rod 56 via the reaction disk 59. Therefore, an output from the output rod 58 drastically increases to a hydraulic value corresponding to a point a illustrated in FIG. 4, leading to occurrence of a so-called jump-in.

After that, as indicated by a characteristic line section 67A, as the input (the pedal pressing force) applied to the input rod 50 increases, the output from the output rod 58 also increases at a predetermined boosting ratio within a range of hydraulic values corresponding to the point a to a point d. In other words, after the pedal pressing force applied to the input rod 50 exceeds the input value fa, the valve body 46 is displaced together with the power piston 45 according to the pressure difference between the negative pressure chamber A and the variable pressure chamber B, and the poppet valve body 51 is displaced together with the valve body 46 in the same direction while being seated on the valve seat portion 46E. During that, the abutment portion 56A of the plunger 56 operates so as to be repeatedly separated from and seated on the poppet valve body 51.

Further, in such a state that the pedal pressing force applied to the input rod 50 is maintained at an arbitrary value, the abutment portion 56A of the plunger 56 is seated on the poppet valve body 51 by maintaining a balanced (equalized) state between the input applied to the input rod 50 (i.e., the pressing force applied to the brake pedal 5) and the reaction force via the reaction disk 59.

Next, when the input increases to the point d (a target full load point) illustrate in FIG. 4 by strongly pressing the brake pedal 5 (pushing in the input rod 50), the pressure difference between the negative pressure chamber A and the variable pressure chamber B is maximized, so that a boosting effect derived from the pressure difference cannot be exerted even if the push-in operation is further performed on the input rod 50. The output rod 58 is axially displaced substantially integrally with the input rod 50 in a region indicated by a characteristic line section 67B, and reaches a stroke end after that.

The characteristic line sections 67A and 68B of the characteristic line 67 illustrated in FIG. 4 are a characteristic when the inside of the negative pressure chamber A of the pneumatic booster 40 is in a sufficient negative pressure state, or when the control in the brake assist mode is performed by the ESC 16 and the anti-lock control and the like are not performed. In this case, the brake hydraulic pressure in each of the wheel cylinders 3L, 3R, 4L, and 4R can be controlled along the characteristic line sections 67A and 67B according to she pressing force (the input) applied to the brake pedal 5.

On the other hand, when the negative pressure in the negative pressure chamber A decreases to some degrees and the control in the brake assist mode is not performed by the ESC 16, the brake hydraulic pressure in each of the wheel cylinders 3L, 3R, 4L, and 4R can be controlled only from hydraulic pressure values corresponding to the points a to c to within a range of a characteristic line section 67C according to the pressing force (the input) applied to the brake pedal 5. However, when the assist control is performed by the ESC 16, the brake hydraulic pressure can be variably controlled along the characteristic line sections 67A and 67B due to the control by the ESC 16 in the brake assist mode, whereby it is possible to acquire a similar characteristic to the characteristic when the inside of the negative pressure chamber A is in a sufficient negative pressure state, i.e., a characteristic that allows the hydraulic pressure to be controlled to the target full load point d.

In this case, the control unit 18 performs brake hydraulic control in the brake assist mode, which is performed when a negative pressure to be used for the pneumatic booster 40 (i.e., a negative pressure generated in the intake manifold of the engine) is insufficient, based on detection signals from the stroke sensor 6, the hydraulic sensors 24 and 24', the hydraulic sensor 38, and the negative pressure sensor 39. In other words, the control unit 18 can estimate a full load point according to the current, negative pressure in the negative pressure chamber A at the point c illustrated in FIG. 4 based on the detection signal from the negative pressure sensor 39 from a calculation. Therefore, when the stoke (the amount of the pressing operation) of the input rod 50 increases to S1 illustrated in FIG. 4 or larger to perform a braking operation by a larger amount than a hydraulic pressure indicated by a dotted line c-c1, the control unit 18 opens the pressure application control valves 37 and 37' and the pressure increase control valves 25, 25', 26, and 26', and closes the supply control valves 23 and 23' and the pressure reduction valves 29, 29', 30, and 30' in the brake assist mode by the ESC 16.

While keeping this state, the control unit 18 actuates the hydraulic pumps 31 and 31' by the electric motor 32 to supply the brake fluid discharged from these hydraulic pumps 31 and 31' to the wheel cylinders 3L, 3R, 4R, and 4L via the first and second pipeline portions 21, 21', 22, and 22', and also supply it to the master cylinder 7 appropriately. As a result, it is possible to secure the braking forces by the wheel cylinders 3L, 3R, 4R, and 4L due to the hydraulic pump 31 while generating a brake hydraulic pressure corresponding to the input to the brake pedal 5 in the master cylinder 7.

On the other hand, when the pressure decreases to such a negative pressure level that the point c illustrated in FIG. 4 is the full load point, and the pressure in the negative pressure chamber A approaches the atmospheric pressure, the control unit 18 also performs the assist control by the ESC 16. As a result, a hydraulic pressure indicated by a dotted line e2-e can be generated in each of the wheel cylinders 3L, 3R, 4R, and 4L when the input rod 50 has a stroke indicated by S2 in FIG. 4. At this time, the hydraulic pressure that can be generated in the hydraulic chambers 11A and 11B of the master cylinder 7 is a hydraulic pressure corresponding to a point e1 on the characteristic line section 67C, but a hydraulic pressure corresponding to a point e is generated in each of the wheel cylinders 3L, 3R, 4R, and 4L by the control by the ESC 16 in the brake assist mode.

When the negative pressure in the negative pressure chamber A matches the atmospheric pressure, the pedal input and the hydraulic pressure that can be generated in the master cylinder 7 have a relationship indicated by a characteristic line section 67D therebetween. However, even in this case, the relationship between the pedal input and the hydraulic pressure can be controlled along the characteristic line sections 67A and 67B illustrated in FIG. 4 by performing the control by the ESC 16 in the brake assist mode.

The input value fb illustrated in FIG. 4 indicates a drastic increase to a hydraulic value corresponding to a point b due to a jump-in according to the conventional technique. In other words, according to the conventional technique, an invalid input (i.e., an invalid input until the hydraulic pressure rises) corresponds to a period since the pedal input increases from zero until the pedal input roaches the input value fb, and this leads to deterioration of the pedal feeling. However, according to the embodiments of the present invention, a weak force is set as the spring force of the return spring 63, so that the invalid input corresponds to a period since the pedal input increases from zero until the pedal input reaches the input value fa, whereby the pedal feeling can be reliably improved.

In this manner, according to the first embodiment, the pneumatic booster 40 as a negative pressure booster is disposed between the brake pedal 5 and the master cylinder 7, and the cylindrical member 60 is provided on the outer circumferential side of the output rod 58 in this pneumatic booster 40. The seal member 62 seeds between the outer circumferential side of this cylindrical member 60 and the housing 41 (the cylindrical portion 42B of the front shell 42), and the O-ring 61 seals between the cylindrical member 60 and the output rod 58. As a result, the cylindrical member 60 is configured to cause a differential pressure between the negative pressure chamber A and the atmosphere chamber C to be applied to the valve body 46.

In this case, the cylindrical member 60 is formed in such a manner that the outer diameter dimension D2 thereof is generally equal to the outer diameter of the small-diameter cylindrical portion 46B of the valve body 46 (the outer diameter dimension D1 illustrated in FIG. 3). The annular abutment portion 60B of the cylindrical member 60 is configured to abut against the cylindrical protruding portion 46B of the valve body 46 and cause the atmospheric pressure to be applied to the valve body 46.

Therefore, the valve body 46 can be set in such a manner that the pressure receiving area to the atmospheric pressure received by the small-diameter cylindrical portion 46B in the variable pressure chamber B of the housing 41 generally matches the pressure receiving area to the atmospheric pressure received by the valve body 46 from the atmosphere chamber C in the master cylinder 7 via the cylindrical member 60. As a result, the return spring 63 for biasing the valve body 46 toward the initial position (the braking release position) illustrated in FIGS. 2 and 3 can be realized with use of a spring that exerts a weaker spring force than the conventional spring.

In other words, according to the conventional technique, a relatively large force is set as the spring force of the biasing member (i.e., the return spring according to the conventional technique) so as to overcome the force from the negative pressure, so that the valve body 46 can be returned toward the variable pressure chamber B when a braking operation is released while the negative pressure chamber A contains a sufficient negative pressure. However, the inside of the intake manifold of the engine for the vehicle is returned from a negative pressure state to a positive pressure state, once the engine is stopped and the brake is actuated when the vehicle is stopped. Therefore, the conventional biasing member with its spring force set based on the negative pressure state causes an increase in the invalid pressing force when a braking operation is performed immediately after the vehicle starts running.

Especially, in the vehicle including the ESC 16 configured in such a manner that a brake hydraulic pressure according to an amount of an operation performed on the brake pedal 5 is supplied from a hydraulic source such as the hydraulic pumps 31 and 31' to the wheel cylinders 3L, 3R, 4L, and 4R on the wheel side, this configuration has such a drawback of leading to a change in a brake pressing force every time the intake manifold (i.e., the negative pressure chamber A of the pneumatic booster) contains a low negative pressure, and providing an uncomfortable feeling to the driver of the vehicle.

Therefore, according to the first embodiment, as described above, the pneumatic booster 40 is configured to cause the atmospheric pressure to be applied to the valve body 46 with use of the cylindrical member 60 and push the valve body 46 with the aid of the differential pressure in the same direction as the biasing direction of the return spring 63. Therefore, a weaker force can be set as the spring force of the return spring 63 than the conventional return spring. As a result, a weaker force can be set as the biasing force of the return spring 63 for returning the valve body 46 toward the variable pressure chamber B when a braking operation is released, which realizes a reduction in the invalid pressing force when a braking operation is performed while the negative pressure is low or zero.

Therefore, according to the first embodiment, it is possible to bias the valve body 46 toward the input rod 50 with the aid of the differential pressure from the atmospheric pressure applied to the valve body 46 due to the seal member 62 in the negative pressure chamber A. Therefore, it is possible to reduce the spring force of the return spring 63 to, for example, a spring force at least capable of returning the valve body 46 to the initial state by overcoming the sliding resistance of the seal member 62 against the cylindrical member 60. Therefore, it is possible to prevent or reduce an increase in the invalid input when the pressure in the negative pressure chamber A is in a low negative pressure state or in an atmospheric pressure state, and prevent or reduce a change in a brake pressing force when a braking operation is performed to prevent or reduce an uncomfortable feeling of the driver of the vehicle.

Figure 5:
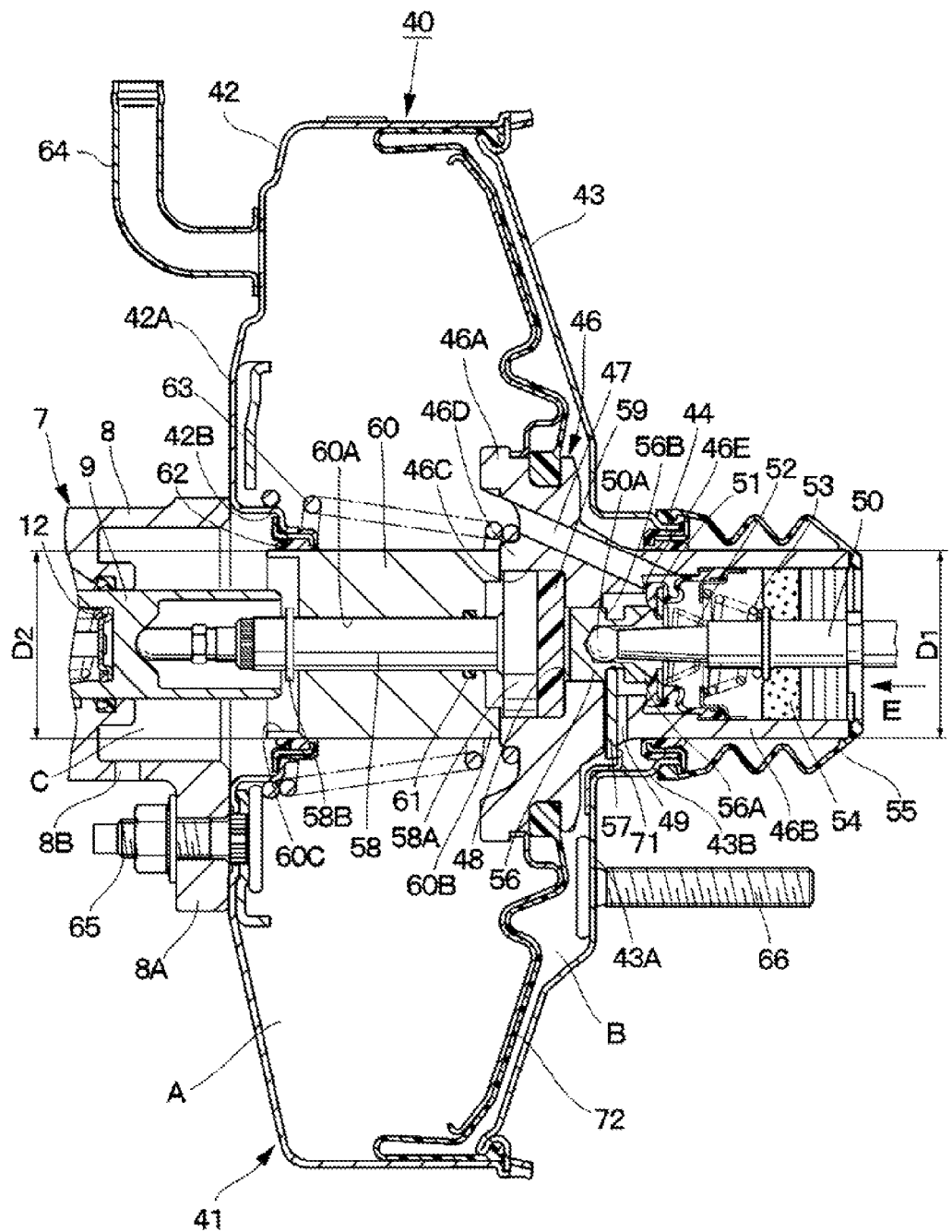
FIG. 5 is a vertical cross-sectional view illustrating a pneumatic booster according to a second embodiment in an enlarged manner (a part thereof illustrated as an end view or the like).

Next, FIG. 5 illustrates a second embodiment of the present invention. In the present embodiment, similar components to the above-described first embodiment are identified by the same reference numerals, and descriptions thereof will be omitted below. However, the second embodiment is characterized in that the pneumatic booster 40 is configured to regulate the return position of the valve body 46 (i.e., the initial position when a braking operation is released) with use of a stopper member 71.

The stopper member 71 is attached at a boundary portion between the real wall 43A and the rear cylindrical portion 43B of the rear shell 43 across both of them, and is fixed to the rear shell 43 by, for example, the welding method. A free end side of the stopper member 71 protrudes radially inwardly in the rear cylindrical portion 43B, and the stop key 57 is in abutment with this protruding-end side.

More specifically, one end of the stop key 57 inserted in the communication passage 49 of the valve body 46 is attached in engagement with the annular groove 56B of the plunger 56, and an opposite end of one stop key 57 protrudes radially outwardly from the communication passage 49 of the valve body 46. The protruding-end side of the stop key 57 regulates the return position of the valve body 46 (i.e., the initial position when a braking operation is released) by abutting against the stopper member 71 at the rear shell 43.

In this manner, when the valve body 46 reaches the return position, the poppet valve body 51 approaches the valve body 46 to a position where the poppet valve body 51 abuts against the valve seat portion 46E of the valve body 46. At this time, the abutment portion 56A of the plunger 56 is seated on the poppet valve body 51 while being in abutment with the poppet valve body 51 so as to block the communication between the variable pressure chamber B and the atmosphere in the small-diameter cylindrical portion 46B. The return spring 53 should be slightly bent by the spring force of the return spring 63 (also including the hydraulic reaction force from the master cylinder 7 when the booster is in operation) so that the abutment portion 56A of the plunger 56 can be reliably seated on the poppet valve body 51. Therefore, the spring force of the return spring 63 is relatively stronger compared to the first embodiment.

A power piston 72 including a diaphragm and the like, which divides the inside of the housing 41 into the negative pressure chamber A as the constant pressure chamber and the variable pressure chamber B, is provided in the housing 41 in a similar manner to the power piston 45 described in the first embodiment. However, the power piston 72 in this case does not include the protruding portion 45A described in the first embodiment, and the return position of the valve body 46 is regulated by abutment between the protruding-end side of the stop key 57 against the stopper member 71 on the rear shell 43.

As such, according to the second embodiment configured in this manner, the pneumatic booster 40 also causes the atmospheric pressure to be applied to the valve body 46 with use of the cylindrical member 60, and pushes the valve body 46 with the aid of the differential pressure therefrom in the same direction as the biasing direction of the return spring 63. As a result, a weaker force can be set as the spring force of the return spring 63 than the conventional return spring, and the second embodiment can acquire a generally similar effect to the first embodiment.

Figure 6:
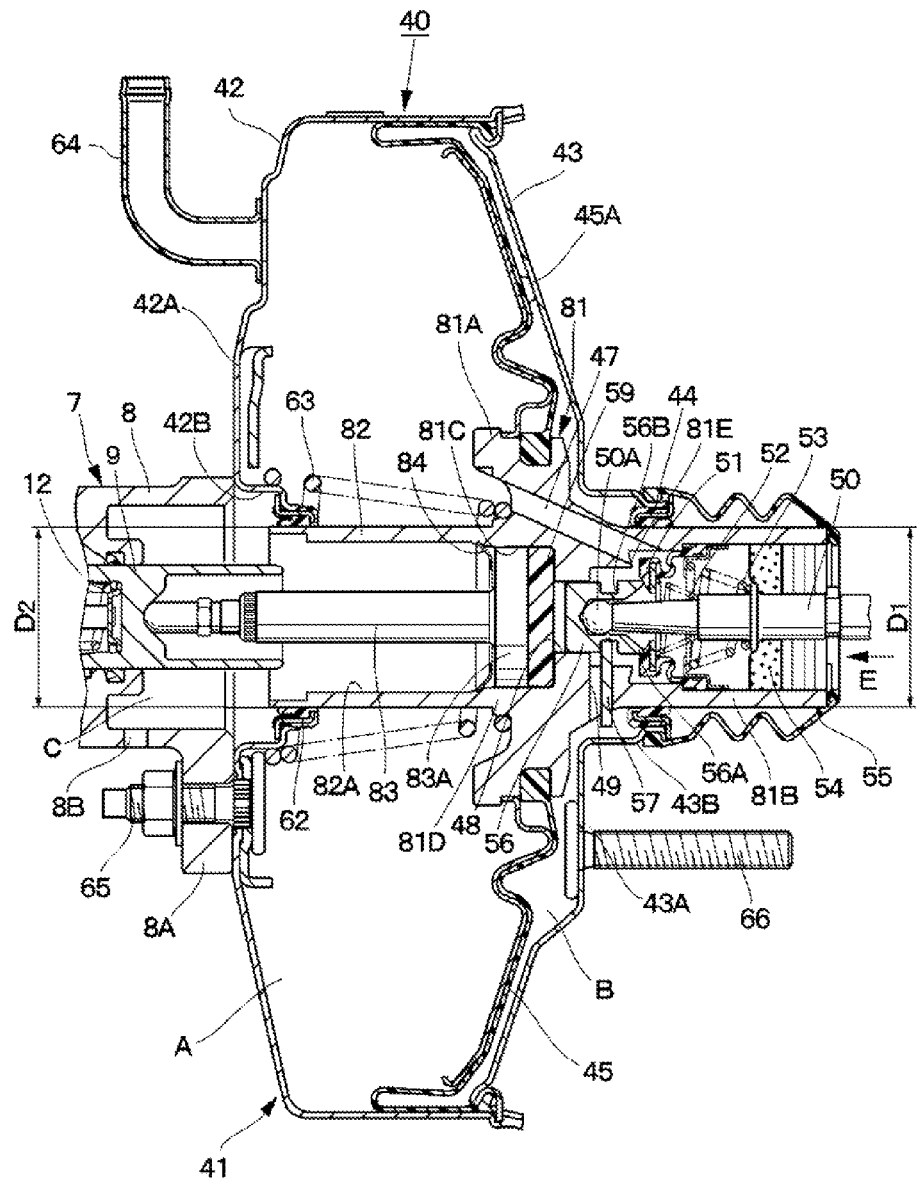
FIG. 6 is a vertical cross-sectional view illustrating a pneumatic booster according to a third embodiment in an enlarged manner (a part thereof illustrated as an end view or the like).

Next, FIG. 6 illustrates a third embodiment of the present invention, and the present embodiment is characterized in that the cylindrical member is formed integrally with the valve body as a single piece. In the third embodiment, similar components to the above-described first embodiment are identified by the same reference numerals, and descriptions thereof will be omitted below.

Referring to FIG. 6, reference numeral 81 denotes a valve body employed in the third embodiment, and this valve body 81 is configured similarly to the valve body 46 described in the first embodiment and includes a main body portion 81A, a small-diameter cylindrical portion 81B, a bottomed hole portion 81C, a cylindrical protruding portion 81D, and a valve seat portion 81E. However, the valve body 81 in this case is different from the first embodiment in terms of the cylindrical protruding portion 81D and a cylindrical member 82 integrally formed as a single piece.

The cylindrical member 82 is formed so as to have the outer diameter dimension D2 generally equal to the diameter of the small-diameter cylindrical portion 81B of the valve body 81 (the outer diameter dimension D1 illustrated in FIG. 6), in a generally similar manner to the cylindrical member described in the first embodiment. The seal member 62, which seals the negative pressure chamber A in the housing 41 from the external atmosphere, is disposed between an outer circumferential surface of the cylindrical member 82 and the cylindrical portion 42B of the front shell 42.

However, a radially inner side of the cylindrical member 82 in this case forms a circular hole portion 82A sized so as to have a slightly larger diameter than the bottomed hole portion 81C of the valve body 81. An output rod 83 is inserted in this circular hole portion 82A with a space formed therebetween. This output rod 83 is configured generally similarly to the output rod 58 described in the first embodiment, and a flange portion 83A having a large diameter is provided on a one axial side of the output rod 83.

This flange portion 83A is fittedly inserted in the bottomed hole portion 81C of the valve body 81 via the reaction disk 59.

Reference numeral 84 denotes a detachment prevention piece disposed in the circular hole portion 82A of the cylindrical member 82, and this detachment prevention piece 84 includes, for example, a retaining ring formed in such a manner that its diameter can be increased and reduced, and is detachably attached to an inner circumferential wall of the circular hole portion 82A. Due to this configuration, the detachment prevention piece 84 maintains the flange portion 83A of the input rod 83 fittedly inserted in the bottomed hole portion 81C of the valve body 81 in a state prevented from being detached off.

As such, according to the third embodiment configured in this manner, the pneumatic booster 40 also causes the atmospheric pressure to be applied to the valve body 81 with use of the cylindrical member 82, and pushes the valve body 46 with the aid of the differential pressure therefrom in the same direction as the biasing direction of the return spring 63. As a result, a weaker force can be set as the spring force of the return spring 63 than the conventional return spring, and the third embodiment can acquire a generally similar effect to the first embodiment.

Figure 7:
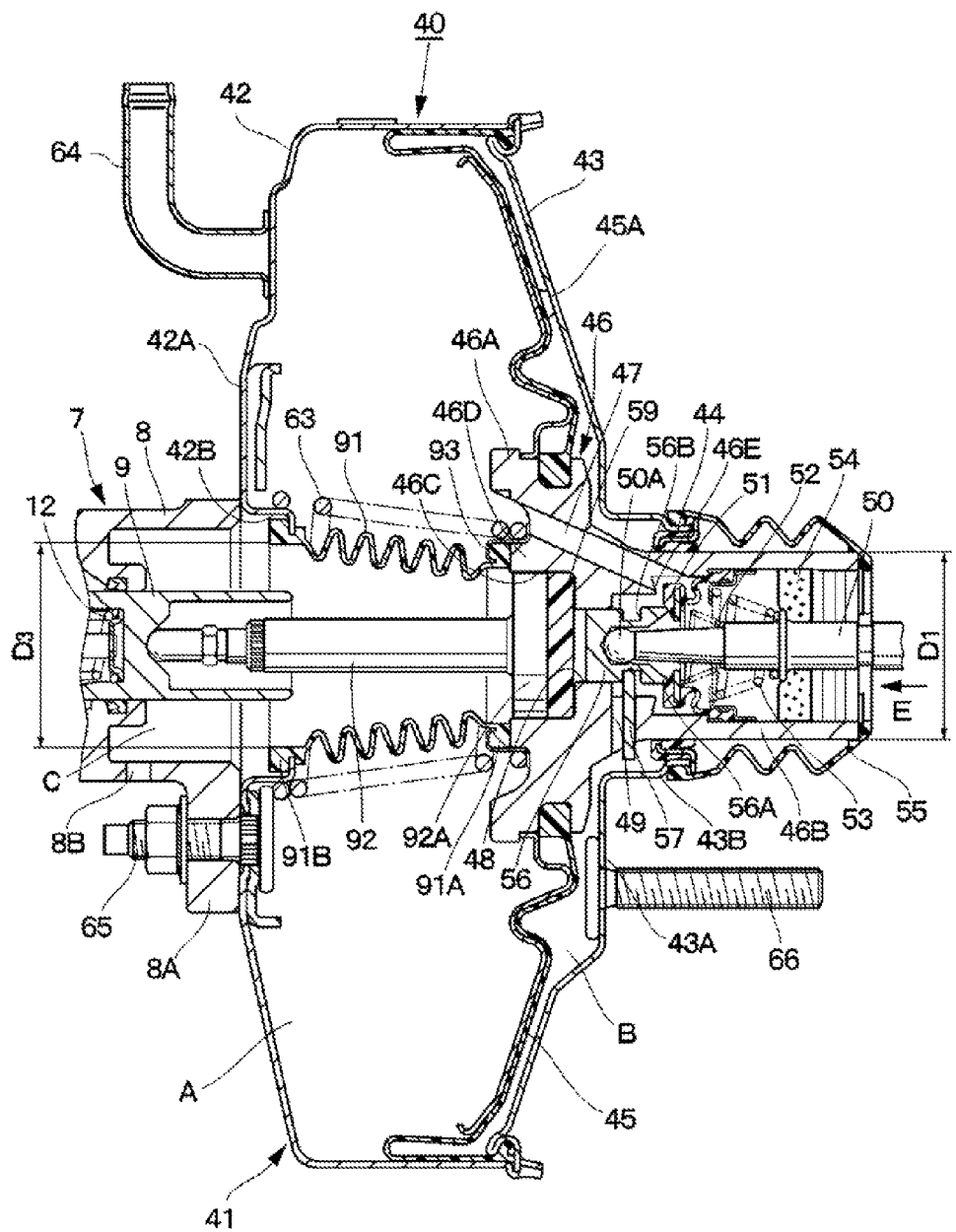
FIG. 7 is a vertical cross-sectional view illustrating a pneumatic booster according to a fourth embodiment in an enlarged manner (a part thereof illustrated as an end view or the like).

Nest, FIG. 7 illustrates a fourth embodiment of the present invention, and the present embodiment is characterized in that the cylindrical member is realized by an expandable and shrinkable bellows-like cylindrical body. In the fourth embodiment, similar components to the above-described first embodiment are identified by the same reference numerals, and descriptions thereof will be omitted below.

In FIG. 7, reference numeral 91 denotes a bellows-like cylindrical body as a cylindrical member employed in the fourth embodiment, and the bellows-like cylindrical body 91 is formed as an expandable and shrinkable boot made from an elastic resin material and has both axial end sides formed as thick annular attachment portions 91A and 91B. The annular attachment portion 91A on a one axial side is formed so as to have a smaller diameter than the annular attachment portion 91B on an opposite axial side, and have a generally equal radial dimension to the dimension of the cylindrical protruding portion 46D of the valve body 46. The annular attachment portion 91A of the bellows-like cylindrical body 91 is fixed to the cylindrical protruding portion 46D of the valve body 46 with use of a fixation piece 93, which will be described below, so as to be prevented from being detached off.

On the other hand, the annular attachment portion 91B of the bellow-like cylindrical body 91 is fixed to the cylindrical portion 42B of the front shell 42 so as to be prevented from being detached off. Due to this configuration, the inside of the bellows-like cylindrical body 91 is sealed from the negative pressure chamber A in an air-tight manner, and is in communication with the atmosphere chamber C in the master cylinder 7. Further, the annular attachment portion 91B of the bellows-like cylindrical body 91 is formed so as to have a larger inner diameter dimension D3 than the dimension of the small-diameter cylindrical portion 46B of the valve body 46 (the outer diameter dimension D1 illustrated in FIG. 7). Further, an outer diameter dimension of the annular attachment portion 91B is larger than the inner diameter dimension D3 by an amount corresponding to its thickness.

The bellows-like cylindrical body 91 also functions as a bellows-like seal member for sealing the negative pressure chamber A in the housing 41 from the external atmosphere between the cylindrical portion 42B of the front shell 42 and the cylindrical protruding portion 46D of the valve body 46. When the valve body 46 is axially displaced in the housing 41, the bellows-like cylindrical body 91 is elastically deformed so as to axially expand or shrink according to this displacement.

Further, an output rod 92 is inserted inside the bellows-like cylindrical body 91 with a space formed therebetween. This output rod 92 is configured generally similarly to the output rod 58 described in the first embodiment, and a flange portion 92A having a large diameter is provided on a one axial side thereof. This flange portion 92A is fittedly inserted in the bottomed hole portion 46C of the valve body 46 via the reaction disk 59.

Reference numeral 93 denotes the fixation piece disposed at the cylindrical protruding portion 46D of the valve body 46, and this fixation piece 93 is formed by, for example, stamping of a metallic plate, and fixes the annular attachment portion 91A of the bellows-like cylindrical body 91 to the cylindrical protruding portion 46D of the valve body 46 so as to prevent the annular attachment portion 91A from being detached off. Further, the fixation piece 93 is configured to also function as a spring bearing that supports a one axial end of the return spring 63 together with the cylindrical protruding portion 46D of the valve body 46.

As such, according to the fourth embodiment configured in this manner, the pneumatic booster 40 also causes the atmospheric pressure to be applied to the valve body 81 with use of the bellows-like cylindrical body 91 and push the valve body 46 with the aid of the differential pressure therefrom in the same direction as the biasing direction of the return spring 63. As a result, a weaker force can be set as the spring force of the return spring 63 than the conventional return spring, and the forth embodiment can acquire a generally similar effect to the first embodiment.

The first embodiment has been described based on the example in which the cylindrical member 60 is formed in such a manner that the outer diameter dimension D2 thereof is generally equal to the dimension of the small-diameter cylindrical portion 46B of the valve body 46 (the outer diameter dimension D1 illustrated in FIG. 3). However, the present invention is not limited thereto, and for example, the cylindrical member may be configured in such a manner that the outer diameter dimension thereof is equal to or larger than an outer diameter dimension of a portion of the valve body that is located in the variable pressure chamber of the housing. The same modification can foe also made to the second and third embodiment.

Next, inventions included in the above-described respective embodiments will be described. A pneumatic booster according to the present invention includes an output rod configured to output an axial displacement of the valve body out of the housing, wherein the portion configured to receive the differential pressure between the constant pressure chamber and the atmosphere is a cylindrical member disposed on an outer circumferential side of the output rod, and wherein the cylindrical member is sealed on an outer circumferential side thereof between the cylindrical member and the housing to cause an atmospheric pressure to be applied to the valve body.

The above-described cylindrical member is configured to cause the atmospheric pressure to be applied to the valve body by abutting against the valve body. Further, the cylindrical member is configured to cause the atmospheric pressure to be applied to the valve body by abutting against the valve body while being sealed on an inner circumferential side thereof between the cylindrical member and the output rod. An outer diameter dimension of the cylindrical member is generally equal to an outer diameter dimension of a portion of the valve body that is located in a variable pressure chamber of the housing. Alternatively, the outer diameter dimension of the cylindrical member is equal to or larger than the outer diameter dimension of the portion of the valve body that is located in the variable pressure chamber of the housing. Further, the pneumatic booster is configured to include a reaction disk between the output rod and the valve body.

On the other hand, the present invention includes:
a housing:
a power piston dividing an inside of the housing into a constant pressure chamber and a variable pressure chamber;
a valve body coupled to the power piston and sealed from an atmosphere on a variable pressure chamber side in the housing;
a plunger movably inserted in the valve body;
an input rod coupled to the plunger;
an output rod coupled to the valve body;
a biasing member configured to bias the valve body toward an input rod side;
a vacuum passage configured to establish communication between the constant pressure chamber and the variable pressure chamber; and
an atmosphere passage configured to open the variable pressure chamber to the atmosphere,
wherein a movement of the plunger relative to the valve body closes the vacuum passage to block the communication between the constant pressure chamber and the variable pressure chamber, and opens the atmosphere passage to introduce the atmosphere into the variable pressure chamber, whereby the power piston is thrust with the aid of a differential pressure generated between the constant pressure chamber and the variable pressure chamber, and
wherein a cylindrical member connected to the valve body and sealed from the atmosphere on a constant pressure chamber side in the housing is disposed on an outer circumference of the output rod.

The pneumatic booster according to the present invention can be used for a hybrid vehicle, a vehicle equipped with a no-idling function, a low negative pressure vehicle, and the like as necessary. Further, the pneumatic booster according to the present invention can be also mounted on a normal vehicle.

Further, a brake system according to the present invention includes:
a master cylinder configured to supply a hydraulic pressure to a wheel cylinder mounted on a wheel of a vehicle;
a pneumatic booster configured to thrust a piston disposed in the master cylinder according to an operation performed on a brake pedal; and
a hydraulic supply apparatus disposed between the master cylinder and the wheel cylinder, and capable of supplying brake fluid in the master cylinder to the wheel cylinder,
wherein the pneumatic booster includes
a valve body coupled to a power piston dividing an inside of a housing into a constant pressure chamber and a variable pressure chamber, and sealed from an atmosphere on a variable pressure chamber side in the housing, and
a biasing member disposed in the housing and configured to bias the valve body toward the variable pressure chamber side,
wherein the valve body is configured to include a portion that receives a differential pressure between the constant pressure chamber and the atmosphere on a constant pressure chamber side in the housing, and wherein the hydraulic supply apparatus supplies the brake fluid in the master cylinder to the wheel cylinder according to a pressure state in the constant pressure chamber to thereby adjust a hydraulic pressure in the wheel cylinder in such a manner that this hydraulic pressure reaches or exceeds a hydraulic pressure that the pneumatic booster can generate in the master cylinder.

REFERENCE SIGNS LIST 1L, 1R front wheel (wheel)
2L, 2R rear wheel (wheel)
3L, 3R front-wheel-side wheel cylinder
4L, 4R rear wheel-side wheel cylinder
5 brake pedal
6 stroke sensor
7 master cylinder
8 cylinder main body
9, 10 piston
11A, 11B hydraulic pressure
12, 13 return spring
14 master reservoir
15A, 15B cylinder-side hydraulic pipe
16 hydraulic supply apparatus (ESC)
17A, 17B, 17C, 17D brake-side pipe portion
18 control unit
24, 24', 38 hydraulic sensor
39 negative pressure sensor
40 pneumatic booster
41 housing
44, 62 seal member
45, 72 power piston
46, 81 valve body
47 communication passage (vacuum passage)
49 communication passage (atmosphere passage)
50 input rod
51 poppet valve body (valve unit)
56 plunger
58, 83, 92 output rod
59 reaction disk
60, 82 cylindrical member
61 O-ring (seal member)
63 return spring (biasing member)
91 bellows-like cylindrical body (cylindrical member)
A negative pressure chamber (constant pressure chamber)
B variable pressure chamber
C atmosphere chamber

The invention claimed is:

1. A pneumatic booster comprising:
a valve body coupled to a power piston dividing an inside of a housing into a constant pressure chamber and a variable pressure chamber, and sealed from an atmosphere on a variable pressure chamber side in the housing;
a biasing member disposed in the housing and configured to bias the valve body toward the variable pressure chamber side; and
an output rod configured to output an axial displacement of the valve body out of the housing
wherein the valve body includes a portion configured to receive a differential pressure between the constant pressure chamber and the atmosphere, on a constant pressure chamber side in the housing,
wherein the portion includes a cylindrical member disposed on an outer circumferential side of the output rod and sealed on an outer circumferential side thereof between the cylindrical member and the housing to cause an atmospheric pressure to be applied to the valve body,
wherein a seal on the valve body from the atmosphere on the variable pressure chamber side in the housing is realized by a seal member fixed to the housing and disposed in such a manner that an outer circumferential surface of the valve body slidably moves on the seal member, and
wherein the cylindrical member causes the atmospheric pressure to be applied by abutting against the valve body.

2. The pneumatic booster according to claim 1, wherein the cylindrical member causes the atmospheric pressure to be applied to the valve body by abutting against the output rod while being sealed on an inner circumferential side thereof between the cylindrical member and the output rod.

3. The pneumatic booster according to claim 1, wherein an outer diameter dimension of the cylindrical member is generally equal to an outer diameter dimension of a portion of the valve body that is located on the variable pressure chamber side in the housing.

4. The pneumatic booster according to claim 1, wherein an outer diameter dimension of the cylindrical member is equal to or larger than an outer diameter dimension of a portion of the valve body that is located on the variable pressure chamber side in the housing.

5. The pneumatic booster according to claim 1, wherein a reaction disk is provided between the output rod and the valve body.

6. A pneumatic booster comprising:
a housing:
a power piston dividing an inside of the housing into a constant pressure chamber and a variable pressure chamber;
a valve body coupled to the power piston and sealed from an atmosphere on a variable pressure chamber side in the housing;
a plunger movably disposed in the valve body;
an input rod coupled to the plunger;
an output rod coupled to the valve body;
a biasing member configured to bias the valve body toward an input rod side;
a vacuum passage configured to establish communication between the constant pressure chamber and the variable pressure chamber; and
an atmosphere passage configured to open the variable pressure chamber to the atmosphere,
wherein a movement of the plunger relative to the valve body closes the vacuum passage to block the communication between the constant pressure chamber and the variable pressure chamber, and opens the atmosphere passage to introduce the atmosphere into the variable pressure chamber, whereby the power piston is thrust with the aid of a differential pressure generated between the constant pressure chamber and the variable pressure chamber,
wherein a cylindrical member connected to the valve body and sealed from the atmosphere on a constant pressure chamber side in the housing is disposed on an outer circumference of the output rod,
wherein a seal on the valve body from the atmosphere on the variable pressure chamber side in the housing is realized by a seal member fixed to the housing and disposed in such a manner that an outer circumferential surface of the valve body slidably moves on the seal member, and wherein the cylindrical member causes the atmospheric pressure to be applied by abutting against the valve body.

7. The pneumatic booster according to claim 6, wherein the cylindrical member causes the atmospheric pressure to be applied to the valve body by abutting against the output rod while being sealed on an inner circumferential side thereof between the cylindrical member and the output rod.

8. The pneumatic booster according to claim 6, wherein an outer diameter dimension of the cylindrical member is generally equal to an outer diameter dimension of a portion of the valve body that is located on the variable pressure chamber side in the housing.

9. The pneumatic booster according to claim 6, wherein an outer diameter dimension of the cylindrical member is equal to or larger than an outer diameter dimension of a portion of the valve body that is located on the variable pressure chamber side in the housing.

10. The pneumatic booster according to claim 6, wherein a reaction disk is provided between the output rod and the valve body.

11. A brake system comprising:
a master cylinder configured to supply a hydraulic pressure to a wheel cylinder mounted on a wheel of a vehicle;
a pneumatic booster configured to thrust a piston disposed in the master cylinder according to an operation performed on a brake pedal; and
a hydraulic supply apparatus disposed between the master cylinder and the wheel cylinder and capable of supplying brake fluid in the master cylinder to the wheel cylinder, the hydraulic supply apparatus being configured to supply the brake fluid in the master cylinder to the wheel cylinder according to a pressure state in a constant pressure chamber to thereby adjust a hydraulic pressure in the wheel cylinder in such a manner that this hydraulic pressure reaches or exceeds a hydraulic pressure that the pneumatic booster can generate in the master cylinder,
wherein the pneumatic booster includes:
a valve body coupled to a power piston dividing an inside of a housing into the constant pressure chamber and a variable pressure chamber, and sealed from an atmosphere on a variable pressure chamber side in the housing;
a biasing member disposed in the housing and configured to bias the valve body toward the variable pressure chamber side; and
an output rod configured to output an axial displacement of the valve body out of the housing,
wherein the valve body is configured to receive a differential pressure between the constant pressure chamber and the atmosphere on a constant pressure chamber side in the housing due to a cylindrical member disposed on an outer circumferential side of the output rod and sealed on an outer circumferential side thereof between the cylindrical member and the housing to cause an atmospheric pressure to be applied to the valve body,
wherein a seal on the valve body from the atmosphere on the variable pressure chamber side in the housing is realized by a seal member fixed to the housing and disposed in such a manner that an outer circumferential surface of the valve body slidably moves on the seal member, and
wherein the cylindrical member causes the atmospheric pressure to be applied by abutting against the valve body.

12. The pneumatic booster according to claim 11, wherein the cylindrical member causes the atmospheric pressure to be applied to the valve body by abutting against the output rod while being sealed on an inner circumferential side thereof between the cylindrical member and the output rod.

13. The pneumatic booster according to claim 11, wherein an outer diameter dimension of the cylindrical member is generally equal to an outer diameter dimension of a portion of the valve body that is located on the variable pressure chamber side in the housing.

14. The pneumatic booster according to claim 11, wherein an outer diameter dimension of the cylindrical member is equal to or larger than an outer diameter dimension of a portion of the valve body that is located on the variable pressure chamber side in the housing.

* * * * *